United States Patent [19]

McBratney

[11] Patent Number: 4,490,636
[45] Date of Patent: Dec. 25, 1984

[54] TERMINAL TRAY FOR RETAINING THE LEADS OF AN ELECTRIC MOTOR

[75] Inventor: Peter McBratney, St. Marys, Australia

[73] Assignee: F. F. Seeley Nominees Pty. Ltd., South Australia, Australia

[21] Appl. No.: 523,156

[22] Filed: Aug. 15, 1983

[30] Foreign Application Priority Data

Aug. 23, 1982 [AU] Australia ............................. PF5517

[51] Int. Cl.³ ........................................... H02K 11/00
[52] U.S. Cl. ..................................... 310/71; 310/194; 310/260; 174/138 F
[58] Field of Search ................. 310/71, 194, 219, 260, 310/42, 43, 214; 174/138 F

[56] References Cited

U.S. PATENT DOCUMENTS

| | | | |
|---|---|---|---|
| 3,518,616 | 6/1970 | Lewis | 310/71 |
| 3,912,957 | 10/1975 | Reynolds | 310/260 |
| 4,197,476 | 4/1980 | Lund | 310/194 |
| 4,328,438 | 5/1982 | Zolman | 310/71 |

FOREIGN PATENT DOCUMENTS 1763353 8/1971 Fed. Rep. of Germany ........ 310/71

*Primary Examiner*—R. Skudy

[57] ABSTRACT

A terminal tray which overlies the windings of a motor stator, has a plurality of lead guides. The guides are arranged to separate the leads from one another and retain them in their respective positions. The joins between the leads and the motor stator are within the tray. Further a lid arrangement and hinge tabs are provided for joining the lid to the tray. A plurality of spigots are extending from the tray into the stator and windings thereof for retaining the tray to the motor.

9 Claims, 5 Drawing Figures

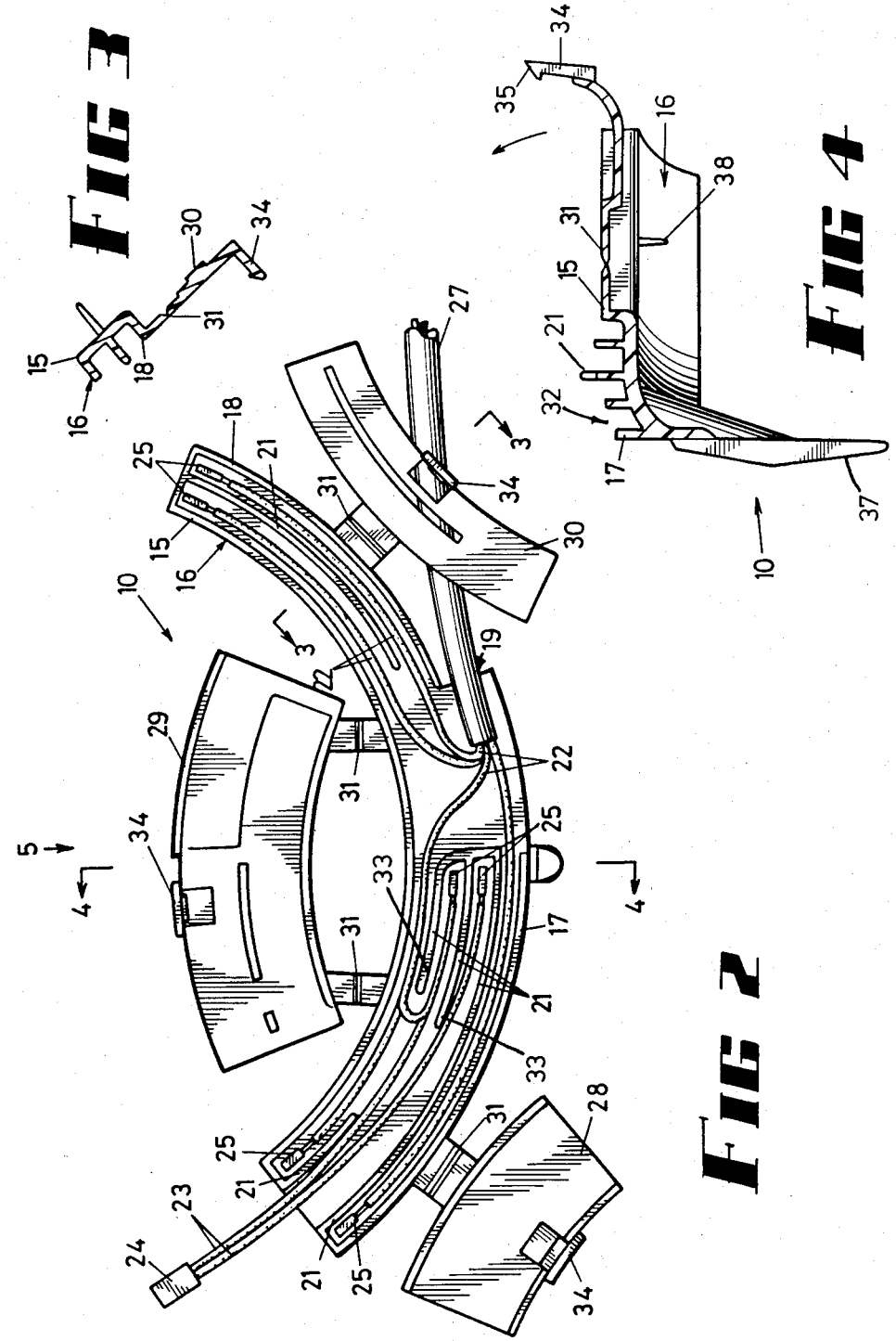

TERMINAL TRAY FOR RETAINING THE LEADS OF AN ELECTRIC MOTOR

This invention relates to improvements in an electric motor of the type having a wound stator. The invention further relates to a motor stator which embodies those improvements.

It is already well recognised that a serious difficulty is encountered in the connection of the windings of an electric motor to the motor leads. A typical motor might for example have five or six leads coming from the windings, and the leads are in themselves physically quite strong and relatively stiff whereas the winding wire is fragile and small in diameter. Common practice has been to bare an end of each lead, bare respective ends of winding wires, solder the leads to the winding wires, cover each soldered joint with a sleeve of insulating material, and then lace the leads to the winding so that mechanical forces are not imposed onto the fragile winding wire.

Notwithstanding this however quite often difficulty is encountered in the winding wire breaking at the locality of the lead. Further, the operation is quite tedious, occupies considerable time and is therefore expensive.

The main object of this invention is to provide improvements to an electric motor in such a way that the connections can be made more quickly and efficiently and and with less likelihood of mechanical loads being placed on the fragile winding wire.

In one embodiment of this invention there is provided a terminal tray which overlies the windings of a motor stator, having a plurality of lead guides therein, the guides being arranged to separate the leads from one another and retain them in their respective positions, the joins between the leads and the motor stator being within the tray.

More specifically, the improvements in this invention comprises a tray of such curved shape as to overlie portion of motor stator windings where they are external of stator laminae, said tray being of polymeric material and having a trough-like cross-sectional shape containing a plurality of motor lead guides spaced from one another, an access opening in a wall of the tray for access of leads thereinto, and retaining means projecting from the tray and engaging said motor stator.

The retaining means on the tray can for example be simply spigots which depend into the motor stator laminae and windings, and are retained therein. The lacing which is used for lacing the windings can effect the required retention, or alternatively, if the entire assembly is subjected to a varnishing and baking operation, the tray can thereby become quite rigidly attached to the windings. The invention reduces danger of mechanical loads being imparted to the fragile winding wires where they join the leads. Furthermore, the connections can be made by a simple crimping process using deformable connectors, and without the need to separately slide insulating sleeves over the join.

An embodiment of the invention is described hereunder in some detail with reference to, and is illustrated in, the accompanying drawings, in which FIG. 1 is an elevational view of a wound stator of a motor of the "squirrel cage" type, FIG. 2 is a plan view of the tray of the invention, showing motor leads in position between the retaining means of the tray.

FIG. 3 is a fragmentary section taken on line 3—3 of FIG. 2,

FIG. 4 is a fragmentary section taken on line 4—4 of FIG. 2, and

Figure 1:
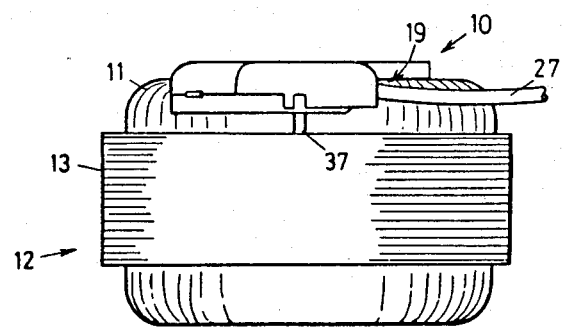

In this embodiment a tray 10 is made of generally arcuate form when viewed in plan, and is of such curved shape as to overlie portion of stator windings 11 of a stator 12 of a "squirrel cage" type motor, which also has ferrous laminae 13. The tray has a trough-like cross-section, with an inner upstanding flange 15 extending for the whole of its length on the inner curved edge 16, and an outer flange 17 extending for part of its length on the outer curved edge, and a second outer flange 18 for a further part of its length. There is however a break between the adjacent ends of the outer flanges 17 and 18, intermediate the ends of the tray to provide an access opening designated 19.

As seen best in FIG. 4 the tray is subdivided into channels 32 by a plurality of upstanding webs 21 which function as motor lead guides and are arranged in a suitable pattern for separating the motor leads 22. In the embodiment shown there are five leads 22, and two extension leads 23 which interconnect one of the leads 22 with the stator windings through a thermal overload device 24. The leads are interconnected with the wires of the windings by deformable crimping connectors 25, and it will be noted that each crimping connector 25 may lie at the end of a channel 32 formed between webs 21, or between the webs 21 and flanges 15 or 17. Furthermore, each crimping connector 25 may be located near the end of a channel 32. As will be seen from FIG. 2, at least one of the leads 22 are so bent around an end 33 of the webs 21 that the cable 27 which carries them is retained to the tray 10.

The tray 10 is formed from a moulded plastics material having the capability of resisting fatigue upon flexure, for example polypropylene or some other polymeric material having this property.

There is at least one lid, and in this embodiment, three lid portions designated 28, 29 and 30, the two lid portions 28 and 30 extending from the outer part of the curve, respectively from flanges 17 and 18, while the central lid portion 29 extends from the inner flange 15 of the inner edge 16 of the tray. In all cases connection is through hinge tabs 31.

Figure 5:
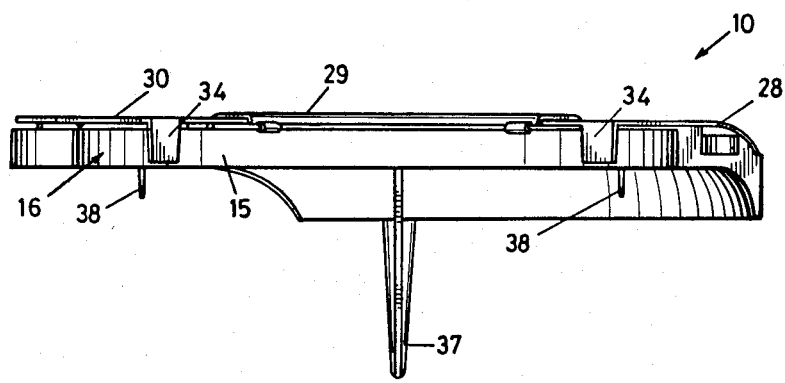
FIG. 5 is a rear elevation of the tray, taken in the direction of arrow 5 of FIG. 2.

As seen best in FIG. 5, lid portions 28 and 30, when closed, are overlapped by ends of the central lid portion 29. Each lid portion has a respective latch tab 34 thereon, and as seen in FIG. 4, each latch tab 34 is provided with a hook end 35 which at least temporarily retains it into position to in turn retain its respective lid portion as a closure to the top of the tray 10.

Temporary retention of the tray 10 is effected primarily by a relatively large spigot 37 which enters a receiving aperture in the laminae 13, while two relatively small spigots 38 enter windings 11 of the stator 12 and retain tray location until the tray is laced in position.

Various modifications in structure and/or function may be made to the disclosed embodiments by one skilled in the art without departing from the scope of the invention as defined by the claims.

What is claimed is:

1. For use in an electric motor having a stator the improvements comprising a tray of such curved shape as to overlie an end portion of motor stator windings where they are external of stator laminae, said tray being of polymeric material and having a troughlike cross-sectional shape containing a plurality of spaced webs defining between them lead guide channels spaced from one another, an access opening in a wall of the tray for access of a plurality of motor leads extending from a cable respectively into some at least of said guide channels, at least one of said leads entering a respective channel by being bent around an end of at least one of said webs for retaining the cable to said tray, and retaining means for engaging the tray to said motor stator.

2. Improvements according to claim 1 further comprising flanges upstanding from an edge of the tray.

3. Improvements according to claim 1 or claim 2 wherein each said lead guide channel web is upstanding from a base of the trough.

4. Improvements according to claim 1 wherein said retaining means comprises spigots depending from the tray, one of said spigots entering an aperture in said stator and another entering said windings.

5. Improvements according to claim 1 further comprising a lid, and hinge tabs joining the lid to the tray.

6. Improvements according to claim 5 wherein said lid comprises three portions, one being a central lid and the others being end lids, each of said lids having a latch tab thereon which engages a surface of said tray upon closure of the lids.

7. Improvements according to claims 1 or 2 wherein a plurality of crimping connectors join ends of respective said motor leads to wires of said windings.

8. Improvements according to claim 2 wherein one of the flanges comprise first and second flanges, the access opening being located between adjacent ends of the first and second flanges.

9. Improvements according to claim 1 wherein the spaced webs form a pattern separating the motor leads.

* * * * *